United States Patent
Fu

(10) Patent No.: US 12,149,875 B2
(45) Date of Patent: *Nov. 19, 2024

(54) METHOD FOR PARAMETER ADJUSTMENT OF LIQUEFIED NATURAL GAS (LNG) DISTRIBUTED TERMINAL BASED ON INTERNET OF THINGS (IOT) AND SYSTEM

(71) Applicant: CHENGDU PUHUIDAO SMART ENERGY TECHNOLOGY CO., LTD., Sichuan (CN)

(72) Inventor: Lin Fu, Chengdu (CN)

(73) Assignee: CHENGDU JIUGUAN SMART ENERGY TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,306

(22) Filed: Oct. 11, 2023

(65) Prior Publication Data

US 2024/0040286 A1 Feb. 1, 2024

Related U.S. Application Data

(63) Continuation of application No. 18/327,870, filed on Jun. 1, 2023, now Pat. No. 11,838,704.

(30) Foreign Application Priority Data

Jun. 7, 2022 (CN) .......................... 202210635737.5
Apr. 28, 2023 (CN) .......................... 202310476076.0

(51) Int. Cl.
*H04Q 9/00* (2006.01)
*G16Y 10/35* (2020.01)

(52) U.S. Cl.
CPC ............... *H04Q 9/00* (2013.01); *G16Y 10/35* (2020.01); *H04Q 2209/60* (2013.01)

(58) Field of Classification Search
CPC ....... H04Q 9/00; H04Q 2209/60; G16Y 10/35
See application file for complete search history.

(56) References Cited

U.S. PATENT DOCUMENTS

2003/0230289 A1* 12/2003 Yamaoka .............. F02D 19/027
123/529
2006/0053791 A1* 3/2006 Prentice, III ............ F23G 5/006
60/645

(Continued)

FOREIGN PATENT DOCUMENTS

| CN | 105306560 A | 2/2016 |
|---|---|---|
| CN | 106534372 A | 3/2017 |

(Continued)

OTHER PUBLICATIONS

Liu, Huiping et al., Thoughts on 'Internet + Intelligent Gas' Helping Shanghai Gas Industry Renovation, Shanghai Energy Conservation, 306-312, 2017.

*Primary Examiner* — Amine Benlagsir
(74) *Attorney, Agent, or Firm* — METIS IP LLC

(57) ABSTRACT

The present disclosure discloses a method for method for parameter adjustment of a liquefied natural gas (LNG) distributed terminal based on Internet of Things and a system. The method includes: based on at least one transmission node on a transmission link, obtaining terminal information of at least one set of terminals and transmission status information of the at least one transmission node; in response to the transmission status information satisfying a preset status condition, predicting a malfunction risk coefficient of the at least one set of terminals at at least one set of future time points; and based on the malfunction risk coefficient and in combination with a device parameter of the at least one set of terminals, judging whether to adjust a control parameter of the at least one set of terminals in advance.

17 Claims, 7 Drawing Sheets

(56) References Cited

U.S. PATENT DOCUMENTS

| | | | | |
|---|---|---|---|---|
| 2006/0150640 | A1* | 7/2006 | Bishop | F17C 9/02 |
| | | | | 62/53.1 |
| 2011/0202256 | A1* | 8/2011 | Sauve | F02D 41/40 |
| | | | | 701/104 |
| 2015/0120166 | A1* | 4/2015 | Fisher | B61C 17/02 |
| | | | | 701/1 |
| 2016/0017823 | A1* | 1/2016 | Sloan | F02M 69/462 |
| | | | | 123/457 |
| 2016/0045841 | A1* | 2/2016 | Kaplan | C01B 32/05 |
| | | | | 429/49 |
| 2018/0231485 | A1* | 8/2018 | Potyrailo | G01N 33/0047 |
| 2021/0285017 | A1* | 9/2021 | Feldmann | C10B 53/02 |
| 2022/0090953 | A1* | 3/2022 | Perko | G01K 13/00 |
| 2022/0099568 | A1* | 3/2022 | Waxman | G01N 21/359 |
| 2023/0116609 | A1* | 4/2023 | Guglielmo | F02D 19/0642 |
| | | | | 701/104 |
| 2023/0135126 | A1* | 5/2023 | Losch | C10L 3/104 |
| | | | | 60/39.12 |

FOREIGN PATENT DOCUMENTS

| | | |
|---|---|---|
| CN | 107707386 A | 2/2018 |
| CN | 107770251 A | 3/2018 |
| CN | 108076137 A | 5/2018 |
| CN | 108594701 A | 9/2018 |
| CN | 108848515 A | 11/2018 |
| CN | 110672172 A | 1/2020 |
| CN | 113395299 A | 9/2021 |
| CN | 113965591 A | 1/2022 |
| CN | 114662803 A | 6/2022 |
| CN | 114745614 A | 7/2022 |
| CN | 114827208 A | 7/2022 |
| CN | 115810271 B | 4/2023 |
| WO | 2016052811 A1 | 4/2016 |

\* cited by examiner

Configuring a distributed terminal object platform through a sensing network platform configuration interface, obtaining relevant information of the terminal object platform, and uploading the relevant information of the terminal object platform to the terminal management platform arranged in a cluster, the terminal object platform including a plurality of access points, and the sensing network platform being respectively connected with the corresponding access points and inter-network protocol IP segments in parallel

Sending an instruction by a service platform to the terminal management platform through an asynchronous interaction according to a request of a user platform, and storing communication information via redis

Performing information management by the terminal management platform on the sensing network platform and the terminal object platform respectively according to the instruction sent by the service platform

```
┌─────────────────────────────────────────────────┐
│ Acquiring monitoring data of at least one set of │ ∕710
│ terminals based on a terminal monitoring device  │
└─────────────────────────────────────────────────┘
                        │
                        ▼
         ╱╲
        ╱  ╲
       ╱ Based on the malfunction risk coefficients ╲
      ╱  and monitoring data of the at least one set  ╲  ∕720
      ╲   of terminals at at least one set of future  ╱
       ╲   time points, judging whether there a      ╱
        ╲         terminal malfunction occurs      ╱
         ╲╱
          │ Yes
          ▼
┌─────────────────────────────────────────────────┐
│ Determining a sending manner and a sending       │ ∕730
│ frequency of reminder information                │
└─────────────────────────────────────────────────┘
```

Fig. 7

METHOD FOR PARAMETER ADJUSTMENT OF LIQUEFIED NATURAL GAS (LNG) DISTRIBUTED TERMINAL BASED ON INTERNET OF THINGS (IOT) AND SYSTEM

CROSS-REFERENCE TO RELATED APPLICATIONS

This application is a continuation of U.S. application Ser. No. 18/327,870, filed on Jun. 1, 2023, which claims priority of the Chinese Patent Application No. 202210635737.5 filed on Jun. 7, 2022, and the Chinese Patent Application No. 202310476076.0, filed on Apr. 28, 2023, the contents of each of which are incorporated herein by reference.

TECHNICAL FIELD

The present disclosure relates to the technical field of terminal management, in particular to a method for parameter adjustment of a liquefied natural gas (LNG) distributed terminal based on Internet of Things (IoT) and a system.

BACKGROUND

Natural gas refers to the combustible gas contained in the formation, mainly a mixture of low-molecular alkanes, which can be divided into two types: dry natural gas and wet natural gas. The composition of dry natural gas is mainly methane, while wet natural gas is composed of not only a large amount of methane, but also large amounts of ethane, propane, and butane. According to the "China Natural Gas Development Report (2021)" published by the Department of Oil and Gas of the National Energy Administration, China's diversified natural gas supply system continues to improve, and a "national network" has basically taken shape. A total of 46,000 kilometers of long-distance pipelines have been built, and the total mileage of natural gas pipelines across the country has reached about 110,000 kilometers. However, there are still a large number of economically underdeveloped areas such as remote suburbs, counties, mountainous areas, and rural areas, and areas with insufficient pipeline radiation, where it is impossible to use safe and clean natural gas with obvious advantages to live and work. According to statistics, nearly 600 million people in China still do not have access to natural gas. However, gas markets in outer suburbs, counties, mountainous areas, and rural areas are potential markets for urban gas. Energy supply in these areas is an integral part of the country's entire energy system, and its supply and consumption will inevitably affect China's energy supply and demand. At present, the focus of urban construction is gradually shifting from the urban area to the outer city, counties, mountainous areas, and rural areas. It is necessary to establish an efficient, safe, and economical energy supply system. In January 2021, the "No. 1 Document" of the central government officially released the policy document of "Gas to the Countryside", proposing to strengthen the construction of rural public infrastructure, promote the implementation of gas to the countryside, and support the construction of safe and reliable rural gas storage tank stations and micro-pipeline network for gas supply. In addition, the state has also issued a series of policies related to the natural gas industry, the main purpose of which is to encourage enterprises to establish a diversified natural gas supply system and support the reform, innovation, and high-quality development of the natural gas industry. For example, through measures such as optimizing the planning and construction layout, establishing a sound operating model, deepening the reform of the physical benefit mechanism, and increasing policy support, the construction of natural gas storage infrastructure is accelerated, further enhancing the natural gas storage capacity. Full play was given to LNG storage tanks for the advantages in gas storage, transportation, and flexibility in transfer to promote the pilot multimodal transportation of LNG tanks, and take multiple measures were taken to improve gas storage capacity. Gas storage facility operating enterprises are encouraged to improve internal management mechanisms and carry out innovation in models and products. Natural gas connectivity is promoted to reach the "last mile". Pilot projects are carried out to send natural gas to the countryside. New models such as Internet+ and energy smart micro-grids are explored to New models such as Internet+ and energy smart micro-grid are explored to realize multi-energy synergistic supply and comprehensive energy gradient utilization. Distributed energy application pilot projects using LNG as the gas source are carried out in areas not covered by the pipeline network.

Liquefied Natural Gas (LNG), whose main component is methane, is recognized as the cleanest fossil energy on Earth. LNG is colorless, odorless, non-toxic, and non-corrosive, its volume is about $1/625$ of the same volume of gaseous natural gas, and the mass of LNG is only about 45% of the same volume of water. The emergence of LNG has achieved a major change in the energy mix of natural gas. The application scenarios of natural gas no longer rely on pipelines and pipeline transportation but can be transformed into application scenarios that can rely on natural gas storage and transportation equipment to meet the needs of more users.

Piped natural gas is best suited for highly populated areas with high gas consumption. However, in recent years, with rising pipeline laying costs, increased investment, and high operating costs year by year, the pipeline transmission capacity has reached its upper limit. Due to its high safety, broad range of applications, cost-effectiveness, and convenience, LNG can be given priority for gas supply in areas not suitable for pipeline laying. With the continuous increase of LNG users, the existing LNG terminal management platform has been unable to cope with high-concurrency and high-load business requirements. At the same time, in the process of transporting LNG after vaporization, the vaporization of LNG will release a large amount of cold energy, which will damage the original environment and cause abnormalities in the LNG terminal. At present, the abnormality of the LNG terminal is judged mainly by monitoring whether the transmission data of the LNG terminal is abnormal. However, it is easy to misjudge the abnormality of the LNG terminal due to the abnormality of the transmission data during the transmission process.

SUMMARY

One of the purposes of this disclosure is to provide a method for parameter adjustment of a liquefied natural gas (LNG) distributed terminal based on Internet of Things (IoT) to solve the technical problem that LNG terminal management cannot cope with high-concurrency and high-load business requirements due to the increasing number of LNG users.

In the first aspect, one or more embodiments of the present disclosure provide a method for parameter adjustment of a liquefied natural gas (LNG) distributed terminal based on IoT, including: based on at least one transmission node on a transmission link of a system, obtaining terminal information of at least one set of terminals and transmission status information of the at least one transmission node; wherein the terminals are LNG smart gas supply terminals; in response to the transmission status information satisfying a preset status condition, predicting a malfunction risk coefficient of the at least one set of terminals at at least one set of future time points based on the terminal information, an environmental parameter, and terminal transmission information of the at least one set of terminals, wherein the malfunction risk coefficient includes at least one of a cold fog risk coefficient, an electrical risk coefficient, and a structural risk coefficient; and based on the malfunction risk coefficient and in combination with a device parameter of the at least one set of terminals, judging whether to adjust a control parameter of the at least one set of terminals in advance, wherein the device parameter includes at least one of a cold energy utilization device parameter, an electrical device parameter, and a mechanical component parameter.

The second purpose of the present disclosure is to provide a system for parameter adjustment of a liquefied natural gas (LNG) distributed terminal to solve the technical problem that LNG terminal management cannot cope with high concurrency and high load business requirements due to the continuous increase of LNG users.

In the second aspect, one or more embodiments of the present disclosure provide a system for parameter adjustment of a liquefied natural gas (LNG) distributed terminal, wherein the system is configured to: based on at least one transmission node on a transmission link of the system, obtain terminal information of at least one set of terminals and transmission status information of the at least one transmission node; wherein the terminals are LNG smart gas supply terminals; in response to the transmission status information satisfying a preset status condition, predict a malfunction risk coefficient of the at least one set of terminals at at least one set of future time points based on the terminal information, an environmental parameter, and terminal transmission information of the at least one set of terminals, wherein the malfunction risk coefficient includes at least one of a cold fog risk coefficient, an electrical risk coefficient, and a structural risk coefficient; and based on the malfunction risk coefficient and in combination with a device parameter of the at least one set of terminals, judge whether to adjust a control parameter of the at least one set of terminals in advance, wherein the device parameter includes at least one of a cold energy utilization device parameter, an electrical device parameter, and a mechanical component parameter.

In the third aspect, one or more embodiments of the present disclosure provide a non-transitory computer-readable storage medium, wherein the storage medium stores computer instructions, and when reading the computer instructions, a computer realizes the above method for parameter adjustment of a liquefied natural gas (LNG) distributed terminal based on Internet of Things.

The beneficial effects of the present disclosure include: the service platform sending an instruction to the terminal management platform via an asynchronous interaction according to the request of the user platform, storing a communication information via the redis, and decoupling the session request and application deployment between the user platform and the terminal management platform, so that the storage of the session request information of the user platform no longer depends on an application server, allowing the terminal management platform to be deployed in a cluster, effectively solving the technical problem that the LNG terminal management cannot cope with the high concurrency and high load business demand due to the increasing number of LNG users.

BRIEF DESCRIPTION OF THE DRAWINGS

In order to more clearly illustrate the technical solutions in the embodiments or prior art of the present disclosure, the following is a brief description of the drawings required in the description of the embodiments or prior art, it is obvious that the drawings in the following description are only some of the embodiments of the present disclosure, for those skilled in the art, other drawings can be obtained based on the structures shown in these drawings without creative effort.

FIG. 1 is an exemplary flowchart illustrating an exemplary process of a method for managing an LNG distributed terminal based on Internet of Things (IoT) according to some embodiments of the present disclosure;

FIG. 7 is an exemplary flowchart for judging whether a terminal malfunction occurs and an exemplary process for addressing the terminal malfunction according to some embodiments of the present disclosure.

DETAILED DESCRIPTION

Figure 2:
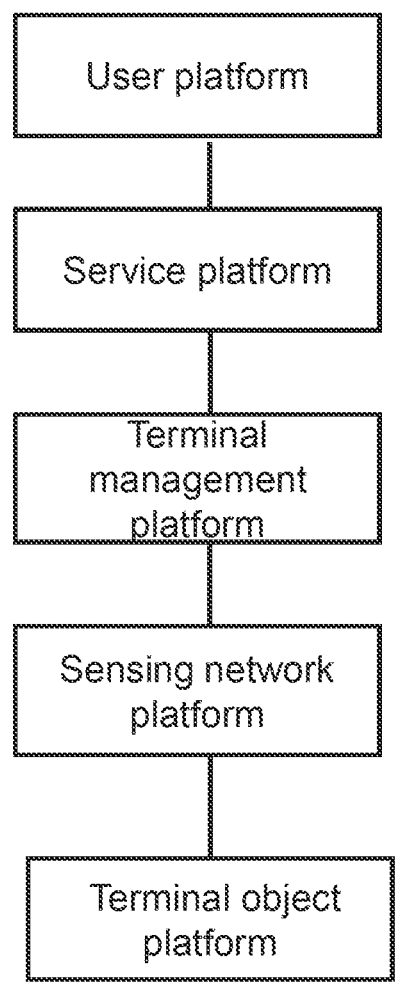
FIG. 2 is an exemplary block diagram of a system for managing an LNG distributed terminal based on Internet of Things (IoT) according to some embodiments of the present disclosure.

In order to make the purposes, technical solutions, and advantages of the embodiments of the present disclosure more clear, the technical solutions in the embodiments of the present disclosure will be clearly and completely described below in conjunction with the drawings in the embodiments of the present disclosure. Obviously, the embodiments described are a part of but not all of the embodiments of the present disclosure. Components of the embodiments of the present disclosure described and illustrated in the drawings herein may be arranged and designed in a variety of different configurations.

It should be noted that like numerals and letters denote similar items in the following figures, therefore, once an item is defined in one figure, it does not require further definition and explanation in subsequent figures.

Some implementations of the present disclosure will be described in detail below with reference to the accompanying drawings. In the case of no conflict, the following embodiments and features in the embodiments can be combined with each other.

As shown in FIG. 1, a method for managing an LNG distributed terminal based on Internet of Things (IoT) includes the following steps: configuring a distributed terminal object platform through a sensing network platform configuration interface, obtaining relevant information of the terminal object platform, and uploading the relevant information of the terminal object platform to the terminal management platform arranged in a cluster, the terminal object platform including a plurality of access points, and the sensing network platform being respectively connected with the corresponding access points and inter-network protocol IP segments in parallel; sending an instruction by a service platform to the terminal management platform through an asynchronous interaction according to the request of a user platform, and storing communication information via redis; and performing information management by the terminal management platform on the sensing network platform and the terminal object platform respectively according to the instruction sent by the service platform.

Further, the asynchronous interaction includes the following steps: storing request information for sending a configuration file in a redis sequence in a memory database by the terminal management platform, and the configuration file being used to configure the terminal object platform; establishing a relationship with a user platform and the terminal management platform through the service platform, and storing a session request sent by the user platform to the service platform in the redis sequence by the terminal management platform; sending a relevant configuration file by the terminal management platform to the user platform according to the instruction sent by the service platform; and storing the received information in the redis sequence after completing receiving by the user platform.

Remote Dictionary Server (redis) is a key-value storage system. Similar to memcached, a distributed caching system, redis supports storing relatively more value types, including string, list, set, zset (sorted set), and hash. These data types all support operations such as push/pop, add/remove, take intersection, union and difference, and some richer operations, and these operations are atomic. On this basis, redis supports sorting in various ways. Like memcached, data is cached in memory to ensure efficiency. The difference is that redis periodically writes updated data to disk or writes modification operations to additional record files, and on this basis, master-slave synchronization is realized.

Figure 3:
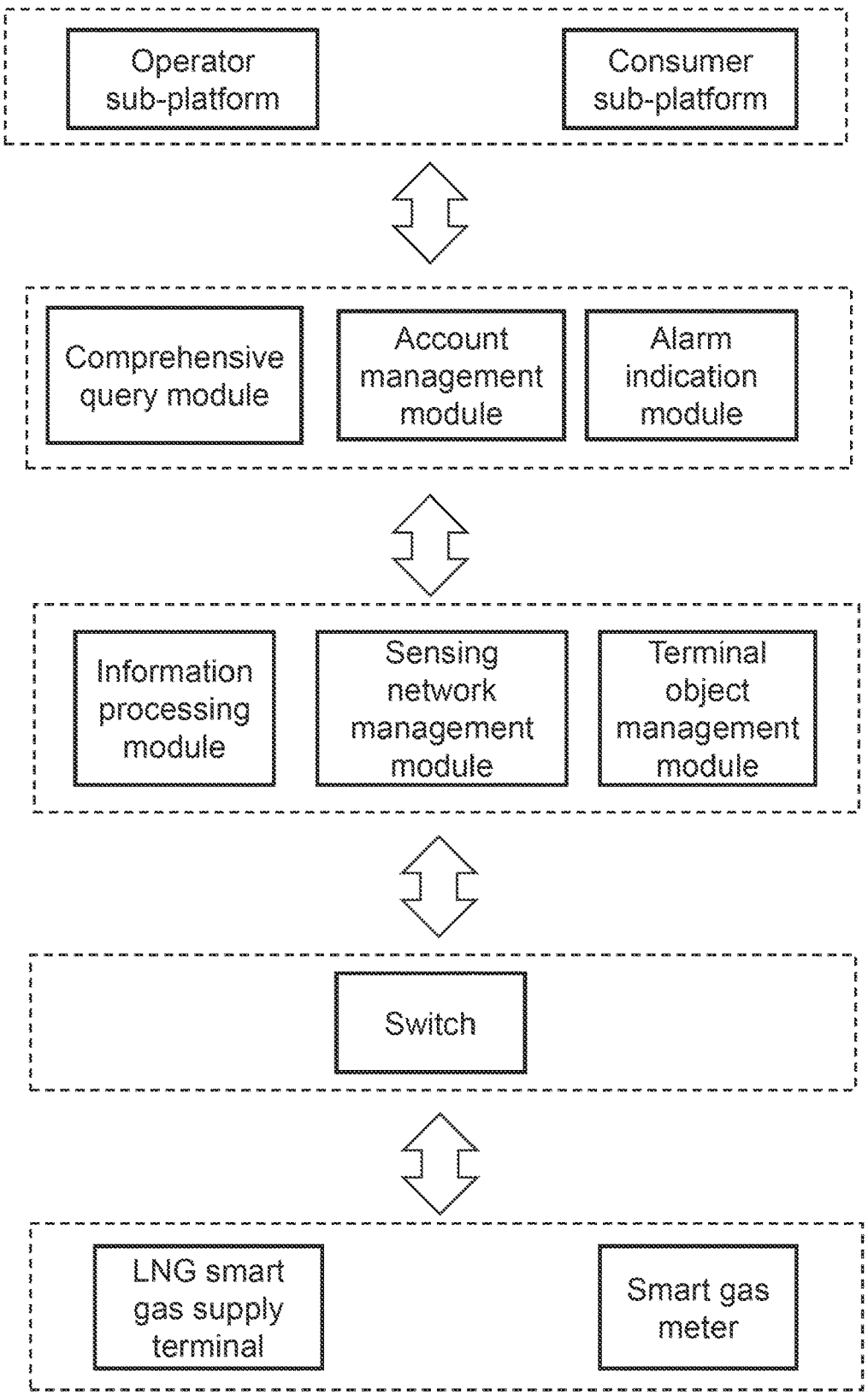
FIG. 3 is a schematic structural diagram of a system for managing an LNG distributed terminal based on the Internet of Things (IoT) according to some embodiments of the present disclosure.

As shown in FIG. 3, the terminal object platform includes an LNG smart gas supply terminal and a smart gas meter. The sensing network platform is connected to the access points of the LNG smart gas supply terminal and the smart gas meter, respectively. Operating status information, location information, malfunction information, LNG storage information, and LNG vaporization information of the LNG smart gas supply terminal are transmitted to the terminal management platform through the sensing network platform; and operating status information, malfunction information, and gas consumption volume information of the smart gas meter are transmitted to the terminal management platform through the sensing network platform. In some embodiments, the LNG smart gas supply terminal may be referred to as an LNG terminal or the terminals mentioned in FIGS. 4-7. The terminal may include one or more of an LNG vaporization station, an LNG receiving station, an LNG filling station, or the like.

Further, the sensing network platform includes a switch and is connected to access points of the LNG smart gas supply terminal and the smart gas meter respectively through a configuration interface of the switch, obtain parameters, command templates, and binding parameters of the LNG smart gas supply terminal and the smart gas meter, the binding parameters and the parameters being associated with the command templates. The command templates are obtained by analyzing and rectifying control commands of the LNG smart gas supply terminal and the smart gas meter, and the LNG smart gas supply terminal and the smart gas meter correspond to different command templates.

Further, the terminal management platform includes an information processing module, the information processing module abstracts the request information for sending the configuration file into a Download Object instance object and stores the Download Object instance object in the redis sequence in the memory database according to serial numbers of the LNG smart gas supply terminal and the smart gas meter.

Further, the terminal management platform also includes a sensing network management module and a terminal object management module. The service platform initiates a GET connection request to the information processing module, and a two-way authentication is performed between the information processing module and the service platform. After the two-way authentication is passed, the sensing network management module and the terminal object management module communicate with the service platform.

Further, the service platform includes a comprehensive query module. When the comprehensive query module starts a session with the sensing network management module and the terminal object management module through the information processing module, respectively, the sensing network platform and the terminal object platform report an inform message. The inform message includes a session ID and device information. The device information includes switch access point information, and the operating status information, the location information, the malfunction information, the LNG storage information, the LNG vaporization information of the LNG smart gas supply terminal, and the operating status information, the malfunction information, the gas consumption volume information of the smart gas meter, and a parameter, a command template, and binding parameter information of the LNG smart gas supply terminal and the smart gas meter. By establishing, through the information processing module, the session ID and the request of the comprehensive query module, the session ID and the request of the comprehensive query module are stored in the redis sequence.

Further, the service platform also includes an account management module and an alarm indication module. The user platform initiates a GET connection request to the comprehensive query module, and a two-way authentication is performed between the comprehensive query module and the user platform. After the two-way authentication is passed, the account management module and the alarm indication module report an inform message, and the inform message includes a session ID and user information, and the user information includes authentication, login, and alarm information. When the user platform sends a session request, the information processing module sends an empty message to ask the user platform whether there is any follow-up operation. At this time, the user platform obtains the Download Object instance object of a configuration file required to be delivered from a redis memory database according to the session ID and sends it to the terminal object platform (the LNG smart gas supply terminal and the LNG smart gas meter). After completing sending the configuration file, the information processing module returns a Transfer Comlate Response, stores the returned result in the redis sequence, and ends the communication interaction. When the user platform sends multiple session requests, the communication session is stored via redis, and the terminal management platform is deployed in a cluster to solve the problem that LNG terminal management cannot cope with high concurrency and high-load business requirements.

Further, the user platform includes an operator sub-platform and a consumer sub-platform, the operator sub-platform is the decision-making layer of LNG distributed energy operation, and an operator may grasp an operation situation of the LNG smart gas supply terminal and a consumption situation of the LNG smart gas meter in real-time through the operator sub-platform and make an adjustment as needed; and the consumer sub-platform is the consumption layer of LNG distributed energy. Consumers can obtain real-time service information such as LNG payment, consumption volume, and alarm reminders through the consumer sub-platform.

FIG. 2 is an exemplary block diagram of a system for managing an LNG distributed terminal based on Internet of Things (IoT) according to some embodiments of the present disclosure. In some embodiments, the system for managing an LNG distributed terminal based on Internet of Things (IoT) may be an Internet of Things (IoT) system.

As shown in FIG. 2, a system for managing an LNG distributed terminal based on Internet of Things (IoT) adopting the above-mentioned method for managing an LNG distributed terminal based on Internet of Things (IoT) includes the user platform, the service platform, the terminal management platform, the sensing network platform, and the terminal object platform connected in sequence. The terminal object platform includes the LNG smart gas supply terminal and the smart gas meter, and through the sensing network platform, obtains relevant information of the LNG smart gas supply terminal and the smart gas meter and uploads the relevant information to the terminal management platform arranged in a cluster, respectively. The service platform sends an instruction to the terminal management platform via an asynchronous interaction and stores communication information via the redis, and the terminal management platform performs information management on the sensing network platform and the terminal object platform according to the instruction sent by the service platform. The sensing network platform is connected to the access points of the LNG smart gas supply terminal and the smart gas meter, respectively, and the operating status information, the location information, the malfunction information, the LNG storage information, and the LNG vaporization information of the LNG smart gas supply terminal are transmitted through the sensing network platform to the terminal management platform. In some embodiments, the malfunction information, the LNG storage information, and the LNG vaporization information of the LNG smart gas supply terminal may all belong to terminal transmission information. Through the sensing network platform, the operating status information, the malfunction information, and the gas consumption volume information of the smart gas meter are transmitted to the terminal management platform. The terminal management platform includes an information processing module, the information processing module abstracts the request information for sending the configuration file into a Download Object instance object and stores the Download Object instance object in the redis sequence in the memory database according to the serial numbers of the LNG smart gas supply terminal and the smart gas meter.

Further, the service platform includes the comprehensive query module. When the comprehensive query module starts a session with the sensing network management module and the terminal object management module through the information processing module, respectively, the sensing network platform and the terminal object platform report an inform message. The inform message includes a session ID and device information. The device information includes the switch access point information, and the operating status information, the location information, the malfunction information, the LNG storage information, and the LNG vaporization information of the LNG smart gas supply terminal, and the operating status information, the malfunction information, and the gas consumption volume information of the smart gas meter, and the parameter, the command template and the binding parameter information of the LNG smart gas supply terminal and the smart gas meter. By establishing through the information processing module the session ID and the request of the comprehensive query module, the session ID and the request of the comprehensive query module are stored in the redis sequence.

Still further, the asynchronous interaction includes the following steps: the terminal management platform stores the request information for sending the configuration file in the redis sequence in the memory database, and the configuration file is used to configure the terminal object platform. The terminal management platform establishes a relationship with the user platform through the service platform, and stores the session request sent by the user platform to the service platform in the redis sequence. The terminal management platform sends the relevant configuration file to the user platform according to the instruction sent by the service platform. After completing receiving, the user platform stores the received information in the redis sequence.

In some embodiments of the present disclosure, storage of a communication session between the user platform and the terminal management platform is realized through the redis, which effectively solves the problem that storage of a session message depends on an application server, so that a session request between the user platform and the terminal management platform is decoupled from an application deployment no longer restricted to a set of application services, and when a large number of LNG users (including suppliers and consumers) send session requests at the same time, a cluster deployment of the terminal management platform can effectively solve the problem that the LNG terminal management cannot cope with high concurrency and high load business demand.

Figure 4:
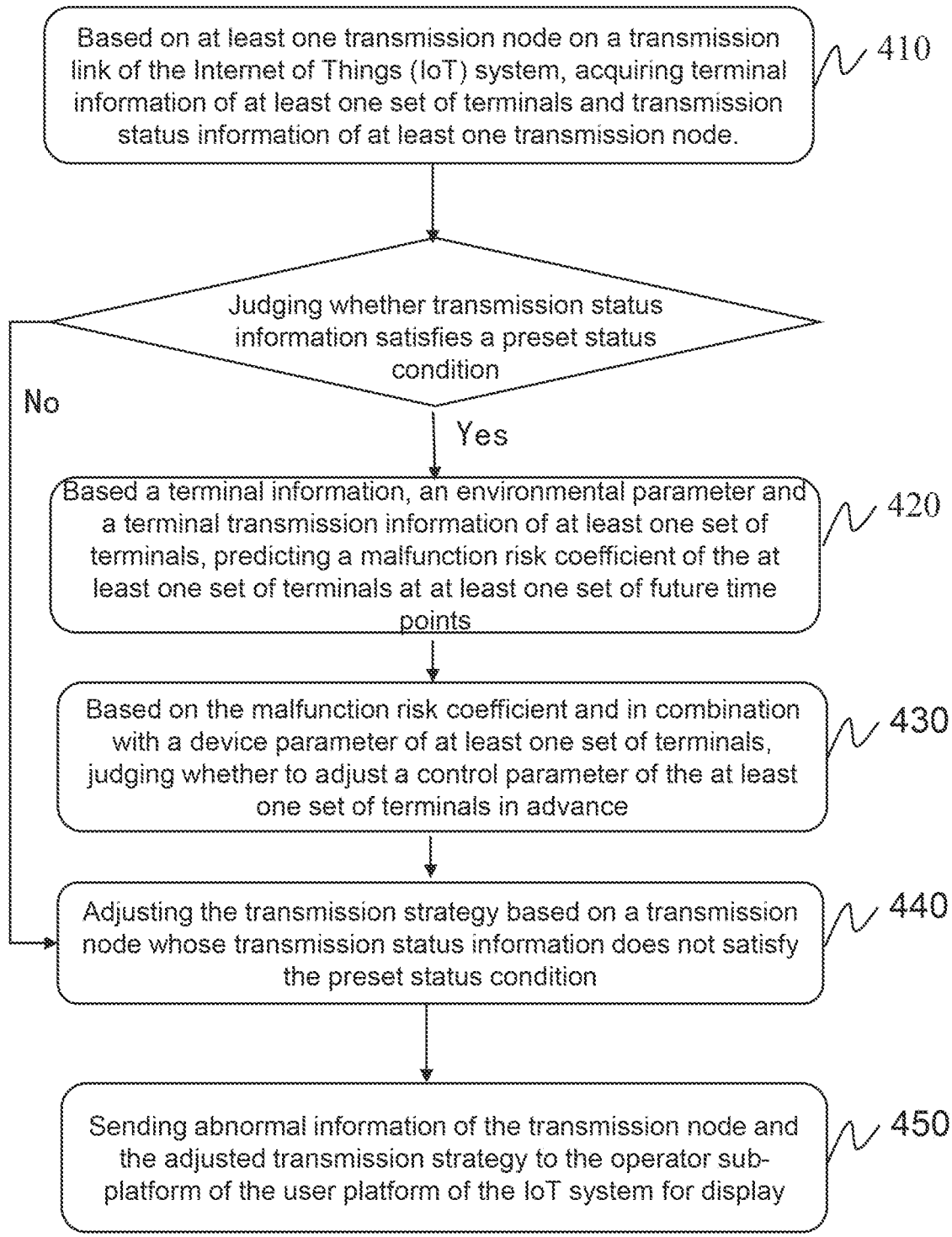
FIG. 4 is an exemplary flowchart of a method for adjustment and presentation of a control parameter or a transmission strategy according to some embodiments of the present disclosure.

FIG. 4 is an exemplary flowchart of a method for adjustment and presentation of a control parameter or a transmission strategy according to some embodiments of the present disclosure; In some embodiments, a process 400 may be executed by the terminal management platform of the system for managing an LNG distributed terminal based on Internet of Things (IoT). The system for managing an LNG distributed terminal based on IoT may be called an IoT system for managing and controlling an LNG distributed terminal or an IoT system. As shown in FIG. 4, the process 400 includes the following steps 410-450.

Step 410: based on at least one transmission node on a transmission link of the system, acquiring terminal information of at least one set of terminals and transmission status information of at least one transmission node.

The IoT system may refer to an interconnected network system formed by various transmission nodes and various platforms. In some embodiments, the IoT system may include the user platform, the service platform, the terminal management platform, the sensing network platform, and the terminal object platform connected in sequence. For more illustrations of the IoT system, see the descriptions of FIG. 2 and FIG. 3 above.

The transmission link refers to a transmission link that an instruction travels from the user platform to the terminal object platform.

The terminal refers to terminals that receive, store, vaporize and supply LNG. In some embodiments, the terminal may include one or more of an LNG vaporization station, an LNG receiving station, an LNG filling station, or the like.

The terminal information refers to information related to judging a malfunction of the terminal. For example, the terminal information may include one or more of a type, a location, a distance, or an operating status of the terminal, etc. The location of the terminal refers to a geographic location of the terminal. The terminal distance refers to a physical distance from the location of the terminal to the location of the terminal management platform. The operating status of the terminal refers to whether the operating status of a terminal is abnormal.

In some embodiments, the terminal information of the terminal may be obtained through the terminal management platform.

The transmission node refers to the terminals through which the transmission link passes and sub-platform(s) of the IoT system. For example, the transmission node may include one or more of an operator sub-platform, a consumer sub-platform, and a consumer's terminal/client corresponding to a sub-platform in the user platform.

The transmission status information refers to information related to the transmission status of the transmission node when a preset time period ends. The preset time period refers to a time period that is set in advance. The preset time period may be set by those skilled in the art according to experience. For example, the transmission status information may include whether the transmission status of the transmission node is normal or abnormal when the preset time period ends.

In some embodiments, the terminal management platform may send an instruction to an upstream transmission node on the transmission link based on at least one transmission node on the transmission link of the IoT system, and then monitor whether a downstream transmission node on the transmission link responds or not for a specified time to determine the transmission status of at least one transmission node. The specified time may be preset by those skilled in the art based on experience, for example, 3 s-6 s, or the like. For example, if the downstream transmission node on the transmission link does not respond within a specified time (for example, 3 s-6 s) after sending an instruction to the upstream transmission node on the transmission link, then the transmission status of the downstream transmission node is abnormal.

In some embodiments, the terminal management platform may construct an instruction transmission map based on the IoT system, and predict the transmission status information of each transmission node through a malfunction prediction model based on the instruction transmission map and the transmission link. The malfunction prediction model may be a machine learning model.

The instruction transmission map refers to the map constructed based on the possible transmission nodes through which an instruction may pass. In some embodiments, there may be one or more transmission links on the instruction transmission map.

In some embodiments, the nodes of the instruction transmission map may include transmission nodes. In some embodiments, the transmission node may include the terminals through which the transmission link passes and sub-platforms of the IoT system. Node attributes may reflect relevant characteristics of a corresponding transmission node. For example, the node attributes may include a platform to which a node belongs, a frequency and a time of a historical node malfunction, a reason for a historical node malfunction, and operating data for a node, etc. The platform to which the node belongs refers to the platform to which the node's corresponding sub-platform belongs. The frequency and the time of the historical node malfunction refer to the frequency and the time of malfunction of the transmission node corresponding to the node in history. The reason for the historical node malfunction refers to the reason for the malfunction of the transmission node corresponding to the node in history. The operating data of the note refer to the data related to the operating of the transmission node corresponding to the node. For example, the operating data for the node may include the operating time of the transmission node corresponding to the node, or the like.

In some embodiments, an edge of the instruction transmission map may include a connecting line between terminals through which the transmission link passes, and a wireless network between sub-platforms and terminals. Edge attributes may reflect relevant characteristics of a corresponding path. For example, the edge attributes may include: a performance parameter of the connecting line between terminals, a performance parameter of the wireless network, a historical frequency and a time of malfunction of the edge, a reason for the historical malfunction of the edge, or the like. The performance parameter of the connecting line between terminals may include one or more of an attenuation coefficient, a bandwidth, and a geometric dimension (e.g., a diameter or a length of the connecting line, etc.) of the connecting line. The performance parameter of the wireless network may include one or more of a wireless signal coverage, an edge field strength, a signal-to-noise ratio, a wireless transmission rate, a throughput, a packet loss rate, and a delay.

In some embodiments, the terminal management platform may construct the instruction transmission map based on the IoT system and the transmission nodes.

In some embodiments, the malfunction prediction model may predict the transmission status information of each transmission node in a preset period based on the instruction transmission map, the transmission link, and the preset period. In some embodiments, the malfunction prediction model may be a machine learning model. For example, the malfunction prediction model may be a graph neural network (GNN).

In some embodiments, the transmission status information of the each transmission node may be represented by a status value. For example, 1 indicates that the transmission status of the transmission node is normal, that is, there is no malfunction of the transmission node. 0 indicates that the transmission status of the transmission node is abnormal, that is, there is a malfunction of the transmission node.

In some embodiments, the terminal management platform may also mark a transmission node with an abnormal transmission status as abnormal.

In some embodiments, the malfunction prediction model may be obtained through training based on a plurality of first training samples with a first label.

In some embodiments, each set of the plurality of first training samples may include a historical sample instruction transmission map, a historical sample transmission link, and a historical sample preset time period. The first label may be an actual transmission status information of each transmission node of a historical sample in a preset period. In some embodiments, the first label may be obtained through a historical data or manual labeling.

In some embodiments, the plurality of first training samples with the first label may be input into an initial malfunction prediction model, and a loss function is constructed through the label and the output of the initial malfunction prediction model. Based on the value of the loss function, by gradient descent or other methods iteratively updating parameters of the initial malfunction prediction model until the loss function is less than a threshold, converges, or a training cycle reaches a threshold, a trained malfunction prediction model is obtained.

In some embodiments of the present disclosure, the malfunction prediction model may be used to quickly and accurately predict the transmission status information of each transmission node, and then timely discover transmission nodes with abnormal transmission status.

In some embodiments, the IoT system may execute the following steps 420-430 in response to the transmission status information satisfying a preset status condition. The IoT system may execute the following steps 440-450 in response to the transmission status information not satisfying the preset status condition.

The preset status condition refers to a preset status condition that the transmission node needs to meet. For example, the preset state condition may be that the transmission status of the transmission node is normal.

Step 420: based a terminal information, an environmental parameter and a terminal transmission information of at least one set of terminals, predicting a malfunction risk coefficient of at least one set of terminals at at least one set of future time points.

The environment parameter refers to a parameter related to the environment where the terminal is located. For example, the environmental parameter may include a temperature value and a vibration condition of the environment where the terminal is located. The vibration condition refers to the reciprocating motion of the terminal in its environment.

The terminal transmission information refers to various information of the LNG transmission process by the terminal. For example, the terminal transmission information may include a (historical) malfunction information of the LNG smart gas supply terminal, an LNG storage information, an LNG vaporization information, a temperature value, a transmission pressure value, a transmission flow rate, a transmission speed, etc.

In some embodiments, the terminal transmission information includes at least flow information obtained based on real-time monitoring of the LNG intelligent gas supply terminal during the transmission of LNG, and flow information of the LNG smart gas supply terminal during the transmission at a future time point predicted based on historical data. The flow information may include the transmission flow rate and the transmission speed of the LNG smart gas supply terminal during the transmission process.

The malfunction risk coefficient refers to the risk coefficient of terminal malfunction. In some embodiments, the malfunction risk coefficient may be expressed as a grade or a percentage.

In some embodiments, the malfunction risk coefficient may include at least one of a cold fog risk coefficient, an electrical risk coefficient, and a structural risk coefficient.

The cold fog risk coefficient refers to the risk coefficient of cold fog after the terminal installs a cold energy utilization device to recycle cold energy. The cold energy utilization device refers to a device used to recycle cold energy (such as cold energy power generation, liquefied air, etc.). The cold energy is caused by a significant drop in temperature caused by a change of a pressure of LNG at the terminal (e.g., LNG becomes gaseous natural gas). Cold fog may occur when the utilization efficiency of the cold energy utilization device for recycling the cold energy is not high or the cold energy utilization device breaks down. The lower the cold energy utilization efficiency of the cold energy utilization device, the higher the cold fog risk coefficient.

The electrical risk coefficient refers to the risk coefficient of an electrical malfunction at the terminal. For example, a risk coefficient of terminal short circuit, open circuit, leakage, etc.

The structural risk coefficient refers to the risk coefficient of a structural malfunction of the terminal. For example, the risk factor of terminal air leakage and device aging.

In some embodiments, the terminal management platform may predict a malfunction risk coefficient of at least one set of terminals at at least one set of future time points based on a terminal information, an environmental parameter, and a terminal transmission information of the at least one set of terminals, through a first preset comparison table. In some embodiments, the first preset comparison table may include correspondences between different terminal information, environmental parameters, and terminal transmission information of a reference terminal and malfunction risk coefficients of the reference terminal at at least one set of future time points. In some embodiments, the first preset comparison table may be constructed according to prior knowledge or historical data.

In some embodiments, the terminal management platform may process terminal information, environmental parameters, and terminal transmission information of at least one set of terminals through a malfunction prediction model, and predict the malfunction risk coefficients of at least one group of terminals at at least one set of future time points. The malfunction prediction model may be a machine learning model. For more details on this part, please refer to FIG. 6 and its description below.

Step 430: based on the malfunction risk coefficient and in combination with a device parameter of at least one set of terminals, judging whether to adjust a control parameter of the at least one set of terminals in advance.

The device parameter refers to the parameter related to the operation of an equipment/component/device itself that has been on the terminal management platform.

In some embodiments, the device parameter may include at least one of a cold energy utilization device parameter, an electrical device parameter, and a mechanical component parameter.

The cold energy utilization device parameter refers to various operating parameters of the cold energy utilization device. The electrical device parameter refers to various operating parameters of the electrical device. The mechanical component parameter refers to various operating parameters of the mechanical component.

The control parameter refers to the control parameter related to information transmitted by the terminal. For example, the control parameter may include a set transmission flow rate or transmission pressure of the LNG smart gas supply terminal during the transmission of LNG. The control parameter may be used to control the device parameter of the terminal and/or change the flow rate and pressure of LNG output.

In some embodiments, the terminal management platform may compare the malfunction risk coefficients of each terminal at at least one set of future time points with preset normal risk coefficient thresholds corresponding to the each terminal based on malfunction risk coefficients of at least one set of terminals at at least one set of future time points. If the malfunction risk coefficient of a certain terminal is greater than the preset normal risk coefficient threshold corresponding to that terminal, it means that the data transmission process or the terminal is abnormal (that is, a malfunction occurs). At the same time, the device parameter of each terminal of the at least one set of terminals is compared with the device parameter of the corresponding each terminal under normal conditions. If it is learned that the terminal is not malfunctioning, it is determined that there is an abnormality in the data transmission process and the control parameter of the terminal is adjusted.

For example, if the cold fog risk coefficient is greater than the preset normal risk coefficient threshold, it means that there is an abnormality (that is, a malfunction occurs) in the data transmission process or in the cold energy utilization device. Based on the parameter feedback of the cold energy utilization device, it is known that if the cold energy utilization device does not malfunction, it is determined that there is an abnormality in the data transmission process and the control parameter of the terminal is adjusted.

Step 440: adjusting the transmission strategy based on a transmission node whose transmission status information does not satisfy the preset status condition.

The transmission node that does not satisfy the preset status condition may refer to a transmission node whose transmission status is abnormal.

The transmission strategy refers to the transmission link selected during the instruction transmission process. In some embodiments, when there are one or more transmission links in the instruction transmission process, the transmission strategy may include selecting one or more transmission links for simultaneous transmission.

In some embodiments, the terminal management platform may adjust the transmission strategy through a preset manner based on the transmission nodes whose transmission status information does not satisfy the preset status conditions.

In some embodiments, the preset manner may be that the terminal management platform regards a transmission node whose transmission status information in the instruction transmission map does not satisfy the preset status condition as an inaccessible transmission node (for example, temporarily hide the transmission node in the instruction transmission map), and then determine other paths that can reach a target transmission note by one or more manners of a backtracking manner, a detour manner, etc. In some embodiments, the target transmission node may refer to the terminal object platform that the transmission link needs to reach eventually.

The backtracking manner refers to finding ways to adjust the transmission strategy by continuously "forwarding" and "backtracking" transmission nodes. Specifically, start from a certain transmission node (initial transmission node) whose transmission status information is abnormal, and search for all transmission links that can reach the target transmission node from this transmission node. When a transmission link reaches the target transmission node (can no longer move forward), then step back one or several steps, start from another possible transmission node, and continue to search until all transmission links have been tested, so as to determine and adjust the transmission strategy.

The detour manner refers to bypassing a transmission node with an abnormal status and reaching the target transmission node. For example, the original transmission link is A-B-C-D. If the status of the transmission node B is abnormal, the transmission node B may be bypassed by two transmission nodes, the transmission node E and the transmission node F, and the transmission link may be changed to A-E-F-C-D.

In some embodiments, the terminal management platform may determine at least one candidate link as a first strategy based on the transmission status information of each transmission node on the transmission link. The terminal management platform may also evaluate whether an implementation cost of each candidate link in the first strategy satisfies a preset cost condition, and in response to the implementation costs of all candidate links in the first strategy satisfying the preset cost condition, adopt a second strategy as an adjusted transmission strategy, or selecting the candidate link with the smallest implementation cost from at least one candidate link in the first strategy whose implementation cost does not meet the preset cost condition, as an adjusted transmission strategy. The implementation cost may be related to an increased number of transmission nodes and a link distance of a candidate link compared with the original transmission link, and associated risk impact of the candidate link. The second strategy may include enabling a backup link for instruction transmission. For more details on this part, please refer to FIG. 5 and its description below.

Step 450: sending abnormal information of the transmission node and the adjusted transmission strategy to the operator sub-platform of the user platform of the IoT system for display.

The abnormal information refers to the information related to the abnormal transmission status of the transmission node. For example, the abnormal information may include one or more of an interruption of the transmission of the transmission node, an error in a transmission information received by the transmission node (for example, garbled characters, etc.), a transmission delay of the transmission node exceeding a preset threshold (for example, the transmission node takes a long time to receive the transmitted instruction), etc. The preset threshold may be set by those skilled in the art according to experience.

In some embodiments, the terminal management platform may send the abnormal information of the transmission node and the adjusted transmission strategy to the operator sub-platform of the user platform through the service platform for display. In some embodiments, the display manner may include one or more of a text presentation, a video presentation, or the like.

In some embodiments of the present disclosure, the transmission status of each transmission node on the transmission link is monitored through the IoT system, transmission nodes with abnormal transmission status are identified in time, and the transmission strategy is adjusted to ensure that the instructions sent by the user platform can reach the terminal object platform and be implemented so as to achieve better LNG user experience.

In some embodiments of the present disclosure, based on the IoT system, first judge whether there is an abnormality in the data transmission, in response to the data transmission being normal, then judge whether the terminal is malfunctioning based on the data transmitted by the terminal. Since this judgment process avoids misjudgment of terminal malfunction due to abnormal data transmission, the accuracy of terminal malfunction judgment is improved.

Figure 5:
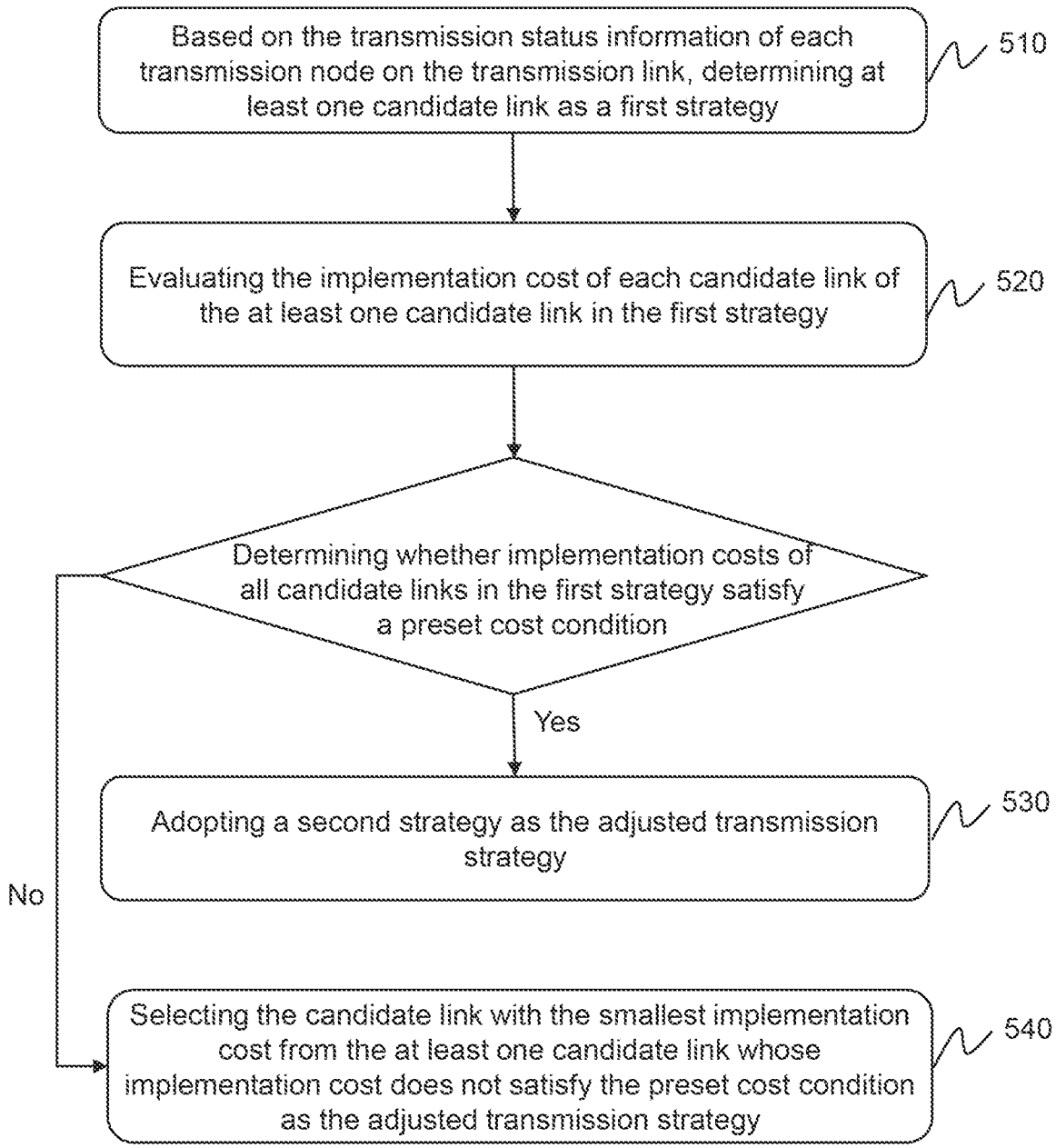
FIG. 5 is an exemplary flowchart for adjusting a transmission strategy according to some embodiments of the present disclosure.

FIG. 5 is an exemplary flowchart for adjusting the transmission strategy according to some embodiments of the present disclosure; In some embodiments, a process 500 may be executed by the terminal management platform of the system for managing an LNG distributed terminal based on Internet of Things (IoT). As shown in FIG. 5, the process 500 includes the following steps 510-540.

Step 510: based on the transmission status information of each transmission node on the transmission link, determining at least one candidate link as a first strategy. The candidate link may refer to a candidate transmission link. For the description of the transmission link, please refer to the description in step 410 in FIG. 4.

The first strategy may refer to a transmission strategy selected during instruction transmission. In some embodiments, the first strategy may include one or more candidate links.

In some embodiments, the first strategy may be determined by the preset manner. For the description of the preset manner, please refer to the description in step 440 in FIG. 4 above.

Step 520: evaluating the implementation cost of each candidate link of the at least one candidate link in the first strategy.

The implementation cost may refer to the cost of using the candidate link for instruction transmission. In some embodiments, the implementation cost may be related to an increased number of transmission nodes and a link distance of a candidate link compared with the original transmission link, and associated risk impact of the candidate link.

The original transmission link refers to the previously used transmission link. The number of transmission nodes may refer to the number of transmission nodes passed by the transmission link. In some embodiments, the increased number of transmission nodes of the candidate link compared with the original transmission link may refer to a difference between the number of transmission nodes of the candidate link and the number of transmission nodes of the original transmission link.

In some embodiments, the difference may be a negative number, zero, or a positive number, wherein a negative number represents that the candidate link has a decreased number of transmission nodes compared with the original transmission link, and zero represents that the candidate link has the same number of transmission nodes as the original instruction transmission link, a positive number represents that the candidate link has an increased number of transmission nodes compared with the original transmission link.

The link distance may refer to the entire route distance traveled by the instruction from the user platform to the terminal object platform. In some embodiments, an increased link distance between the candidate link and the original transmission link may refer to a difference in link distance between the candidate link and the original transmission link. In some embodiments, the difference may be a negative number, zero, or a positive number, wherein a negative number represents that the candidate link has a reduced link distance compared with the original transmission link, zero represents that the candidate link has the same link distance as the original transmission link, and a positive number represents that the candidate link has an increased link distance compared with the original transmission link.

In some embodiments, compared with the original transmission link, the greater the number of nodes and the longer the link distance, the more resources will be consumed, and the transmission time delay will increase, so the implementation cost will be higher.

The associated risk impact may refer to the risk impact of adopting the candidate link on other transmission links.

In some embodiments, the associated risk impact may be related to a number of newly added malfunction nodes.

The number of newly added malfunction nodes may refer to the number of newly added malfunction transmission nodes of other transmission links when a candidate link is adopted. In some embodiments, the terminal management platform may input the candidate link into the malfunction prediction model to predict the malfunction transmission nodes after the candidate link is adopted, and further compare the output malfunction transmission nodes with the output malfunction transmission nodes corresponding to the original transmission link one by one, to determine the newly added malfunction nodes and the number of these malfunction nodes. For more details about the malfunction prediction model, please refer to the relevant description in step 410 of FIG. 4.

In some embodiments, the greater the number of newly added malfunction nodes, the greater the corresponding associated risk impact, and vice versa.

In some embodiments of the present disclosure, the number of newly added malfunction nodes is used to evaluate the associated risk impact, fully considering the impact on other transmission links when using candidate links, and improving the reliability and accuracy of the determined associated risk impact.

In some embodiments, the associated risk impact may also be related to a gas impact corresponding to a newly added faulty transmission node.

The gas impact may refer to the gas impact brought by the newly added malfunction transmission node on the gas user on the corresponding target transmission node. In some embodiments, the target transmission node may refer to the terminal object platform that the transmission link needs to reach eventually. In some embodiments, the gas impact may be determined based on the number of gas users and gas flow rates covered by the target transmission nodes of the transmission link corresponding to the newly added malfunction transmission nodes in the prediction results of the malfunction prediction model.

In some embodiments, the greater the number of gas users covered by the target transmission nodes corresponding to the newly added malfunction transmission nodes and the faster the gas flow rate, the greater the gas impact caused by the newly added malfunction transmission nodes, and the corresponding associated risk impact, and vice versa. For example, the number of gas users corresponding to the target transmission node of the transmission link L1 of the malfunction transmission node a is 2, and the gas flow rate is 50 cubic meters per month, but in order to avoid the malfunction transmission node a, the candidate link L2 is used, leading to the newly added malfunction transmission node b, which is also the transmission node on another transmission link L3. The number of users corresponding to the target transmission node of L3 is 5, and the gas flow rate is 150 cubic meters per month. Obviously, the activation of the candidate link L2 may affect the gas usage of more gas users, and the gas impact will be greater, and the corresponding associated risk impact will be greater.

In some embodiments of the present disclosure, the number of newly added malfunction nodes is used to evaluate the associated risk impact, fully considering the impact on other transmission links when using candidate links, and further improving the reliability and accuracy of the determined associated risk impact.

In some embodiments, the terminal management platform may determine the implementation cost of each candidate link based on the added number of transmission nodes and link distance of the each candidate link in the at least one candidate link in the first policy compared to the original transmission link, and the associated risk impact corresponding to the each candidate link. For example, the greater the number of transmission nodes and the longer the link distance of the candidate link compared with the original transmission link, and/or the greater the associated risk impact of the candidate link, the higher the corresponding implementation cost is set.

In some embodiments, the terminal management platform may also determine whether implementation costs of all candidate links in the first strategy satisfy the preset cost condition, and when the preset cost condition is satisfied, perform the following step 530; and when the preset cost condition is not satisfied, the following step 540 is performed.

Step 530: in response to the implementation costs of all candidate links in the first strategy satisfying a preset cost condition, adopting a second strategy as the adjusted transmission strategy.

The preset cost condition may refer to a cost condition in which the implementation cost of the candidate link exceeds a preset range. In some embodiments, the preset cost condition may include that, compared with the original transmission link, one or more of a number of increased transmission nodes, an increased link distance, and an increased associated risk impact corresponding to a candidate link exceed the preset range. In some embodiments, the preset range may be artificially set in advance based on experience.

In some embodiments, the preset cost condition may also include a cost threshold.

The cost threshold may refer to a threshold for the cost of implementation. In some embodiments, the cost threshold may include a maximum value of the implementation cost.

In some embodiments, the cost threshold may be related to the importance of the instruction sent by the service platform. In some embodiments, when the importance of the instruction is high, the cost threshold may be appropriately lowered, so that it is easier to activate the backup link when transmitting the important instruction, so as to ensure that the important instruction can be smoothly transmitted to the terminal object platform. In some embodiments, the importance of the instruction may be artificially preset in advance according to experience.

The backup link may refer to a temporary link prepared in advance. In some embodiments, the backup link may be activated only in the event of a malfunction and shut down again after the malfunction is resolved.

In some embodiments, the cost threshold may also be related to the number of gas users and the gas flow rate. In some embodiments, the greater the number of gas users covered by the target transmission node and the greater the gas flow rate, the greater the benefits of adjusting the transmission strategy to ensure its normal transmission, and thus the higher the acceptable implementation cost, and the higher the cost threshold may be set.

In some embodiments of this the present disclosure, the cost threshold is determined by the importance of the instructions sent by the service platform, and then the preset cost condition is determined. The preset cost conditions may be flexibly adjusted according to specific situations, which is conducive to more accurately determining the adjusted transmission strategy.

The second strategy may refer to candidate links different from the first strategy. In some embodiments, the second strategy may include activating a backup link for instruction transmission.

In some embodiments, the terminal management platform may adopt the second strategy as the adjusted transmission strategy in response to the implementation costs of all candidate links in the first strategy satisfying a preset cost condition. For example, when the implementation costs of all candidate links in the first strategy exceed the cost threshold, the backup link is activated as the adjusted transmission strategy.

Step 540: in response to the implementation cost of at least one candidate link in the first strategy not satisfying the preset cost condition, selecting the candidate link with the smallest implementation cost from the at least one candidate link whose implementation cost does not satisfy the preset cost condition as the adjusted transmission strategy.

In some embodiments, the terminal management platform may rank at least one candidate link whose implementation cost does not satisfy the preset cost condition from lowest to highest according to the implementation cost corresponding to each candidate link, and use the candidate link corresponding to the first-ranked implementation cost as the adjusted transmission strategy.

In some embodiments, the terminal management platform may use the candidate link with the lowest implementation cost as the adjusted transmission strategy.

In some embodiments of the present disclosure, a plurality of candidate links are further screened based on implementation costs and candidate links, and the candidate link with the lowest implementation cost is finally screened as the adjusted transmission strategy, thereby improving the flexibility of adjusting the transmission strategy while minimizing the implementation cost of the adjusted instruction transmission link.

It should be noted that the above descriptions about the processes 400 and 500 are only for illustration and description, and do not limit the scope of application of the present disclosure. For those skilled in the art, various modifications and changes may be made to the process 400 under the guidance of the present disclosure. However, such modifications and changes are still within the scope of the present disclosure. For example, the process 400 may only include the steps 410-430.

Figure 6:
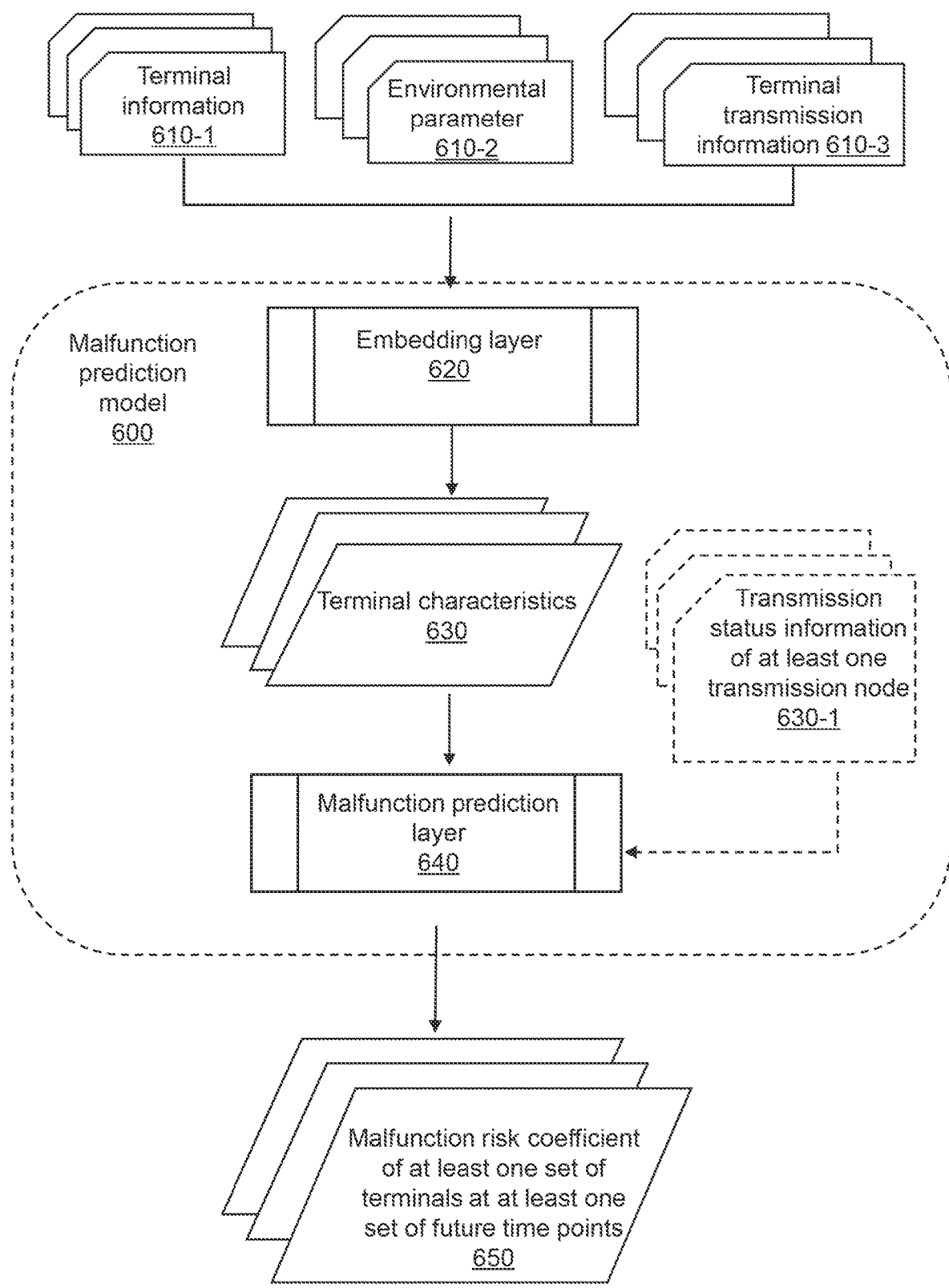
FIG. 6 is an exemplary flowchart for predicting a malfunction risk coefficient for at least one set of terminals at at least one set of future time points according to some embodiments of the present disclosure.

FIG. 6 is an exemplary flowchart for predicting a malfunction risk coefficient for at least one set of terminals at at least one set of future time points according to some embodiments of the present disclosure. In some embodiments, a process 600 may be executed by the terminal management platform of the system for managing an LNG distributed terminal based on Internet of Things (IoT) or the IoT system for managing and controlling an LNG distributed terminal.

In some embodiments, the terminal management platform may process a terminal information 610-1, an environmental parameter 610-2, and a terminal transmission information 610-3 of at least one set of terminals through a malfunction determination model 600, and predict a malfunction risk coefficient of at least one set of terminals at at least one set of future time points 650.

For descriptions of the terminal information, the environment parameter and the terminal transmission information, please refer to the descriptions in step 410 and step 420 in FIG. 4.

In some embodiments, the malfunction prediction model may be a machine learning model. In some embodiments, the malfunction prediction model may include a neural network (NN) model, a long short term memory (LSTM) model, or the like.

In some embodiments, the malfunction prediction model may be trained based on a large number of second training samples with a second label.

In some embodiments, the second training samples for the malfunction prediction model may be obtained based on historical data. The second training label may be obtained based on an actual malfunction type (for example, malfunction indicated as 1, or no malfunction indicated as 0) of a historical sample terminal corresponding to an input data in a historical data at at least one set of sample time points, or obtained through manual labeling.

In some embodiments, the malfunction prediction model may include an embedding layer 620 and a malfunction prediction layer 640.

In some embodiments, the embedding layer 620 may be a long short term memory (LSTM) model. The embedding layer may handle sequence data from different terminals at different times. In some embodiments, the embedding layer may be used to process the terminal information 610-1, the environment parameter 610-2, and the terminal transmission information 610-3 of at least one set of terminals to determine a terminal characteristics 630 of the at least one set of terminals.

The terminal characteristics may be a data characteristic vector obtained after processing the terminal information, the environment parameter, and the terminal transmission information of at least one set of terminals.

In some embodiments, the malfunction prediction layer 640 may be a neural network (NN) model. The malfunction prediction layer may output malfunction risk coefficients of different terminals at different time points. In some embodiments, the malfunction prediction layer may be used to process the terminal characteristics 630 of at least one set of terminals, and predict the malfunction risk coefficient 650 of at least one set of terminals at at least one set of future time points.

In some embodiments, an input of the malfunction prediction layer 640 may also include transmission status information of at least one transmission node 630-1. For the description of the transmission status information, please refer to the description in step 410 in FIG. 4.

In some embodiments of the present disclosure, since transmission status information of a transmission node may reflect an abnormal transmission status of the transmission node, which in turn indicates whether there is a problem in the transmission of data and affects the confidence level of the malfunction prediction layer, therefore, taking into account the transmission status of a transmission node in the malfunction prediction layer may improve the accuracy of output results of a trained malfunction prediction layer.

In some embodiments, the malfunction prediction model may be obtained through joint training of the embedding layer and the malfunction prediction layer based on a plurality of third training samples with a third label.

In some embodiments, each set of the plurality of third training samples may include terminal information, environment parameters and terminal transmission information of historical sample terminals. The third label may be an actual malfunction type (for example, malfunction indicated as 1, or no malfunction indicated as 0) of the historical sample terminal at at least one set of time points. In some embodiments, the third label may be obtained through historical data or manual labeling.

In some embodiments, the terminal information, the environmental parameters and the terminal transmission information of the historical sample terminals in the plurality of third training samples with the third label may be input into an initial embedding layer, and then the historical sample terminal characteristics output from the initial embedding layer are input to the initial malfunction prediction layer and a loss function is constructed through the label and the output of the initial malfunction prediction model. Based on the value of the loss function, by gradient descent or other methods iteratively updating parameters of the initial malfunction prediction model until the loss function is less than a threshold, converges, or a training cycle reaches a threshold, a trained malfunction prediction model is obtained.

In some embodiments, training samples of the initial malfunction prediction layer may also include transmission status information of at least one historical sample transmission node.

In some embodiments of the present disclosure, since the judgment of a terminal malfunction involves not only analyzing working data, operating parameters, monitoring data, etc. uploaded by the terminal, but also analyzing the reliability of a data transmission link, and an abnormal transmission link may lead to abnormal data uploaded by the terminal, which in turn affects the accuracy of the judgment of terminal device malfunction. Therefore, taking into account the transmission status information of the data transmission link in the malfunction prediction model may make the prediction results of the trained malfunction prediction model more reliable and accurate.

FIG. 7 is an exemplary flowchart for judging whether a terminal malfunction occurs and an exemplary process for addressing the terminal malfunction according to some embodiments of the present disclosure. In some embodiments, a process 700 may be executed by the management platform of the system for managing an LNG distributed terminal based on Internet of Things (IoT) or the IoT system for managing and controlling LNG distributed terminal. As shown in FIG. 7, the process 700 may include steps 710-730.

Step 710: acquiring monitoring data of at least one set of terminals based on a terminal monitoring device.

The terminal monitoring device refers to a device for monitoring the operation of the terminal. For example, the terminal monitoring device may be various types of sensors.

The monitoring data refer to data acquired by the terminal monitoring device for real-time monitoring of the operation conditions of the terminal. For example, the monitoring data may include one or more of a cold energy utilization efficiency, an electrical parameter, or the like. The monitoring data may be expressed as a percentage. The cold energy utilization efficiency may reflect an efficiency of eliminating cold fog. The electrical parameter refers to a parameter related to the operation of an equipment/component/device on the terminal obtained through real-time monitoring by the terminal monitoring device. The electrical parameter may reflect whether a real-time parameter (e.g., a data storage and reading time, a control instruction response time, etc.) of an equipment/component/device on the terminal is normal.

In some embodiments, the monitoring data of at least one set of terminals may be monitored based on the terminal monitoring device, and then the terminal management platform obtains the monitoring data of at least one set of terminals through the terminal monitoring device.

Step 720: based on the malfunction risk coefficients and monitoring data of the at least one set of terminals at at least one set of future time points, judging whether there is a terminal malfunction.

For the description of the malfunction risk coefficient, please refer to the description in step 420 in FIG. 4. The terminal malfunction refers to a terminal malfunction that may affect the normal operation of the terminal, but cannot be judged through direct monitoring.

In some embodiments, the terminal management platform may predict whether a terminal malfunction occurs based on the malfunction risk coefficients and monitoring data of at least one set of terminals at at least one set of future time points and through a second preset comparison table. In some embodiments, the second preset comparison table may include malfunction risk coefficients of a reference terminal at at least one set of different future time points and whether a corresponding relationship between a monitoring data and the reference terminal is abnormal. In some embodiments, the second preset comparison table may be constructed based on prior knowledge or historical data.

In some embodiments, the terminal management platform may determine whether a terminal malfunction occurs through a preset algorithm based on malfunction risk coefficients and monitoring data of at least one set of terminals at at least one set of future time points.

The preset algorithm refers to a preset feasible algorithm. For example, the preset algorithm may be: H=monitoring data*$\alpha$–malfunction risk coefficient*$\beta$; If the result H is positive, the terminal is judged to be normal; if the result H is less than or equal to 0, the terminal is judged to be malfunctioning. $\alpha$ and $\beta$ are coefficients. $\alpha$ is related to the service life and remaining life of the terminal, $\beta$ is related to the environmental parameters, and the sum of $\alpha$ and $\beta$ is 1. Both $\alpha$ and $\beta$ are preset artificially.

In some embodiments of the present disclosure, by using the preset algorithm and taking into account the service life, remaining life, and the environmental parameter of related components of a terminal, it is possible to determine more reliably whether a malfunction occurs in a terminal, and then adjust the control parameters of the terminal where the malfunction occurs in a timely manner or in advance to avoid the expansion of damage or serious consequences.

Step 730: in response to a terminal malfunction occurring, determining a sending manner and a sending frequency of reminder information.

The reminder information refers to any information used to remind an occurrence of the terminal malfunction. For example, the reminder information may include a sound, a text, or a combination of a sound and a text, etc.

The sending manner of the reminder information refers to a manner used to send the reminder information. For example, the reminder information may be sent in text only. For another example, the reminder information may be sent in the form of a combination of text and sound.

The sending frequency of the reminder information refers to a time interval for sending the reminder information on the terminal malfunction.

In some embodiments, the terminal management platform may determine the sending manner and sending frequency of the reminder information according to a severity of the terminal malfunction. For example, if the severity of the terminal malfunction is high, the sending frequency may be accelerated and the reminder information may be sent in the form of a combination of text and sound.

In some embodiments, the sending frequency may also be related to a transmission status information of a relevant transmission node in a transmission link. The related transmission node refers to the transmission node associated with the malfunction terminal in the transmission link. For example, the relevant transmission node may be the initial transmission node on the transmission link where the malfunction terminal is located.

In some embodiments, if the transmission status information of the relevant transmission node in the transmission link shows a terminal malfunction, the sending frequency may be increased to prevent data transmission problems from affecting the timeliness of event processing.

In some embodiments of the present disclosure, since whether the transmission status information of neighboring transmission nodes is abnormal is also taken into account in the reminder information on the terminal malfunction, data transmission problems can be prevented from affecting the event processing timeliness to a certain extent.

Reference herein to "some embodiments" or "an embodiment" refers to specific features, structures, or characteristics that may be included in at least one embodiment of the present disclosure. In the description of the present disclosure, it should be understood that the orientation or positional relationship represented by the terms "upper", "lower", "front", "backward" etc. is based on the orientation or positional relationship shown in the drawings, and is only for the purpose of convenient description of the present disclosure, but does not indicate or imply that the device or element referred to must have a specific orientation, be constructed and operate in a specific orientation, and thus should not be construed as limiting the present disclosure.

In the above embodiments, the basic principles, main features, and advantages of the present disclosure are described. It should be understood by those skilled in the art that the present disclosure is not limited by the above-mentioned embodiments. What is described in the above-mentioned embodiments and description is only to illustrate the principles of the present invention. All modifications and changes without departing from the spirit and scope of the present disclosure should be within the scope of the appended claims of the present disclosure.

What is claimed is:

1. A method for parameter adjustment of a liquefied natural gas (LNG) distributed terminal based on Internet of Things (IoT) system, implemented by the IoT system for the parameter adjustment of the liquefied natural gas (LNG) distributed terminal, comprising:
    based on at least one transmission node on a transmission link of the system, obtaining terminal information of at least one set of terminals and transmission status information of the at least one transmission node;
    wherein the at least one set of terminals are LNG smart gas supply terminals;
    in response to the transmission status information satisfying a preset status condition, predicting a malfunction risk coefficient of the at least one set of terminals et at least one set of future time points based on the terminal information, an environmental parameter, and terminal transmission information of the at least one set of terminals, wherein the malfunction risk coefficient includes at least one of a cold fog risk coefficient, an electrical risk coefficient, and a structural risk coefficient; and
    based on the malfunction risk coefficient and in combination with a device parameter of the at least one set of terminals, judging whether to adjust a control parameter of the at least one set of terminals in advance, wherein the device parameter includes at least one of a cold energy utilization device parameter, an electrical device parameter, and a mechanical component parameter;
    wherein the system includes a user platform, a service platform, a terminal management platform, a sensing network platform, and a terminal object platform connected in sequence, wherein the terminal object platform includes an LNG smart gas supply terminal and a smart gas meter, through the sensing network platform, relevant information of the LNG smart gas supply terminal and relevant information of the smart gas meter are obtained and uploaded to the terminal management platform arranged in a cluster, respectively, the service platform sends an instruction to the terminal management platform via an asynchronous interaction and stores communication information via redis according to a request of the user platform, the terminal management platform performs information management on the sensing network platform and the terminal object platform according to the instruction sent by the service platform;

the sensing network platform is connected to access points of the LNG smart gas supply terminal and the smart gas meter, respectively, operating the transmission status information and a location information of the LNG smart gas supply terminal, the terminal information, the environmental parameter, and the terminal transmission information are transmitted through the sensing network platform to the terminal management platform;

operating the transmission status information, a malfunction information, and a gas consumption volume information of the smart gas meter are transmitted to the terminal management platform through the sensing network platform; and the terminal management platform includes an information processing module, the information processing module is configured to determine whether the transmission status information of the at least one transmission node satisfies the preset status condition based on the system, and in response to the transmission status information satisfying the preset status condition, determine whether a terminal abnormality occurs according to the terminal information, the environmental parameter, and the terminal transmission information of the at least one set of terminals.

2. The method according to claim 1, wherein obtaining the transmission status information of the at least one transmission node includes:

constructing an instruction transmission map based on the IoT system, wherein nodes of the instruction transmission map include transmission nodes, the transmission nodes include in the at least one set of terminals and sub-platforms of the IoT system, and edges of the instruction transmission map include a connecting line among the at least one set of terminals on the transmission link and a wireless network between the sub-platforms and the at least one set of terminals; and predicting the transmission status information of each transmission node of the transmission nodes through a malfunction prediction model based on the instruction transmission map and the transmission link, the malfunction prediction model being a machine learning model.

3. The method according to claim 1, comprising:

in response to the transmission status information not satisfying the preset status condition, adjusting a transmission strategy based on the at least one transmission node whose the transmission status information does not satisfy the preset status condition;

wherein adjusting the transmission strategy includes:

determining at least one candidate link of a plurality of candidate links as a first strategy based on the transmission status information of the at least one transmission node on the transmission link;

evaluating an implementation cost of the at least one candidate link in the first strategy, wherein the implementation cost is related to an increased count of transmission nodes and a link distance of the at least one candidate link compared with an original transmission link and associated risk impact of the at least one candidate link;

in response to implementation costs of the plurality of candidate links in the first strategy satisfying a preset cost condition, adopting a second strategy as an adjusted transmission strategy, wherein the second strategy includes enabling a backup link for instruction transmission; and in response to the implementation cost of the at least one candidate link in the first strategy not satisfying the preset cost condition, selecting a candidate link with a smallest implementation cost from the at least one candidate link whose the implementation cost does not satisfy the preset cost condition as the adjusted transmission strategy.

4. The method according to claim 3, wherein the associated risk impact is positively related to a count of newly added malfunction transmission nodes when the at least one candidate link is used or gas impact corresponding to the newly added malfunction transmission nodes;

the gas impact is impact of the newly added malfunction transmission nodes on gas users on target transmission nodes corresponding to the newly added malfunction transmission nodes; and the target transmission nodes are terminal object platforms that the transmission link needs to reach eventually; or the preset cost condition includes a cost threshold, and the cost threshold is negatively related to an importance degree of instructions issued by the service platform of the system.

5. The method according to claim 1, wherein the predicting of the malfunction risk coefficient of the at least one set of terminals at the at least one set of future time points based on the terminal information, the environmental parameter, and the terminal transmission information of the at least one set of terminals includes:

processing the terminal information, the environmental parameter, and the terminal transmission information of the at least one set of terminals through a malfunction prediction model, and predicting the malfunction risk coefficient of the at least one set of terminals at the at least one set of future time points, the malfunction prediction model being a machine learning model.

6. The method according to claim 5, wherein an input of the malfunction model also includes the transmission status information of the at least one transmission node; and the malfunction model includes an embedding layer and a malfunction prediction layer, wherein the embedding layer processes the terminal information, the environmental parameter, and the terminal transmission information of the at least one set of terminals, and determines terminal characteristics of the at least one set of terminals; and the malfunction prediction layer processes the terminal characteristics of the at least one set of terminals or the transmission status information of the at least one transmission node and determines the malfunction risk coefficient of the at least one set of terminals at the at least one set of future time points.

7. The method according to claim 5, wherein the malfunction risk coefficient is used to determine whether the terminal abnormality occurs, including:
   acquiring monitoring data of the at least one set of terminals based on a terminal monitoring device; and
   based on the malfunction risk coefficient and the monitoring data of the at least one set of terminals at the at least one set of future time points, judging whether the terminal abnormality occurs.

8. The method according to claim 7, wherein based on the malfunction risk coefficient and the monitoring data of the at least one set of terminals at the at least one set of future time points, judging whether the terminal abnormality occurs includes:
   determining a difference between a converted value of the monitoring data and a converted value of the malfunction risk coefficient to judge whether the terminal abnormality occurs;
   wherein a conversion coefficient of the monitoring data is determined based on a service life and a remaining life of the at least one set of terminals, and a conversion coefficient of the malfunction risk coefficient is determined based on the environmental parameter.

9. The method according to claim 7, further comprising:
   in response to occurrence of the terminal abnormality, determining a sending manner and a sending frequency of reminder information; wherein
   the sending frequency is determined based on the transmission status information of relevant transmission nodes in the transmission link; and the relevant transmission nodes include initial transmission nodes of an abnormal terminal on the transmission link.

10. The method according to claim 1, wherein the asynchronous interaction includes:
    storing request information for sending a configuration file in a redis sequence in a memory database by the terminal management platform, and the configuration file being used to configure the terminal object platform;
    establishing a relationship with the user platform and the terminal management platform through the service platform, and storing a session request sent by the user platform to the service platform in the redis sequence by the terminal management platform;
    sending a relevant configuration file by the terminal management platform to the user platform according to the instruction sent by the service platform; and
    storing received information in the redis sequence after completing receiving by the user platform.

11. The method according to claim 10, wherein the terminal management platform includes the information processing module, the information processing module is configured to abstract the request information for sending the configuration file into a Download Object instance object and store the Download Object instance object in the redis sequence in the memory database according to serial numbers of the LNG smart gas supply terminal and the smart gas meter.

12. The method according to claim 11, wherein the terminal management platform further includes a sensing network management module and a terminal object management module, a two-way authentication is performed between the information processing module and the service platform, and after the two-way authentication is passed, the sensing network management module and the terminal object management module communicate with the service platform.

13. The method according to claim 12, wherein the service platform includes a comprehensive query module, when the comprehensive query module starts a session with the sensing network management module and the terminal object management module through the information processing module, respectively, the sensing network platform and the terminal object platform report an inform message, the inform message includes a session ID and device information, the device information includes switch access point information, an operating status information, the location information, the malfunction information, LNG storage information, LNG vaporization information of the LNG smart gas supply terminal, and the operating status information, the malfunction information, and the gas consumption volume information of the smart gas meter, and a parameter, a command template, and binding parameter information of the LNG smart gas supply terminal and the smart gas meter, and the session ID and a request of the comprehensive query module are established through the information processing module and are stored in the redis sequence.

14. The method according to claim 13, wherein the service platform further includes an account management module and an alarm indication module, a two-way authentication is performed between the comprehensive query module and the user platform, after the two-way authentication is passed, the user platform communicates with the account management module and the alarm indication module, and when the user platform sends a plurality of session requests, a communication session is stored via redis.

15. The method according to claim 1, wherein the sensing network platform include a switch and is connected to the access points of the LNG smart gas supply terminal and the smart gas meter respectively through a configuration interface of the switch to obtain parameters, command templates, and binding parameters of the LNG smart gas supply terminal and the smart gas meter, the binding parameters and the parameters are associated with the command templates, the command templates are obtained by analyzing and rectifying control commands of the LNG smart gas supply terminal and the smart gas meter, and the LNG smart gas supply terminal and the smart gas meter correspond to different command templates.

16. A system for parameter adjustment of a liquefied natural gas (LNG) distributed terminal, wherein the system is configured to:
    based on at least one transmission node on a transmission link of the system, obtain terminal information of at least one set of terminals and transmission status information of the at least one transmission node;
    wherein the at least one set of terminals are LNG smart gas supply terminals;
    in response to the transmission status information satisfying a preset status condition, predict a malfunction risk coefficient of the at least one set of terminals at at least one set of future time points based on the terminal information, an environmental parameter, and terminal transmission information of the at least one set of terminals, wherein the malfunction risk coefficient includes at least one of a cold fog risk coefficient, an electrical risk coefficient, and a structural risk coefficient; and
    based on the malfunction risk coefficient and in combination with a device parameter of the at least one set of terminals, judge whether to adjust a control parameter of the at least one set of terminals in advance, wherein the device parameter includes at least one of a cold energy utilization device parameter, an electrical device parameter, and a mechanical component parameter;

wherein the system includes a user platform, a service platform, a terminal management platform, a sensing network platform, and a terminal object platform connected in sequence, wherein the terminal object platform includes an LNG smart gas supply terminal and a smart gas meter, through the sensing network platform, relevant information of the LNG smart gas supply terminal and relevant information of the smart gas meter are obtained and uploaded to the terminal management platform arranged in a cluster, respectively, the service platform sends an instruction to the terminal management platform via an asynchronous interaction and stores communication information via redis according to a request of the user platform, the terminal management platform performs information management on the sensing network platform and the terminal object platform according to the instruction sent by the service platform;

the sensing network platform is connected to access points of the LNG smart gas supply terminal and the smart gas meter, respectively, operating the transmission status information and location information of the LNG smart gas supply terminal, the terminal information, the environmental parameter, and the terminal transmission information are transmitted through the sensing network platform to the terminal management platform;

operating the transmission status information, a malfunction information, and gas consumption volume information of the smart gas meter are transmitted to the terminal management platform through the sensing network platform; and the terminal management platform includes an information processing module, the information processing module is configured to determine whether the transmission status information of the at least one transmission node satisfies the preset status condition based on the system, and in response to the transmission status information satisfying the preset status condition, determine whether a terminal abnormality occurs according to the terminal information, the environmental parameter, and the terminal transmission information of the at least one set of terminals.

17. The system according to claim 16, wherein the asynchronous interaction includes:

storing request information for sending a configuration file in a redis sequence in a memory database by the terminal management platform, and the configuration file being used to configure the terminal object platform;

establishing a relationship with the user platform and the terminal management platform through the service platform, and storing a session request sent by the user platform to the service platform in the redis sequence by the terminal management platform;

sending a relevant configuration file by the terminal management platform to the user platform according to the instruction sent by the service platform; and storing received information in the redis sequence after completing receiving by the user platform.

\* \* \* \* \*